Oct. 23, 1923.
G. F. MILES
WINDSHIELD CONSTRUCTION
Filed May 15, 1922
1,471,856
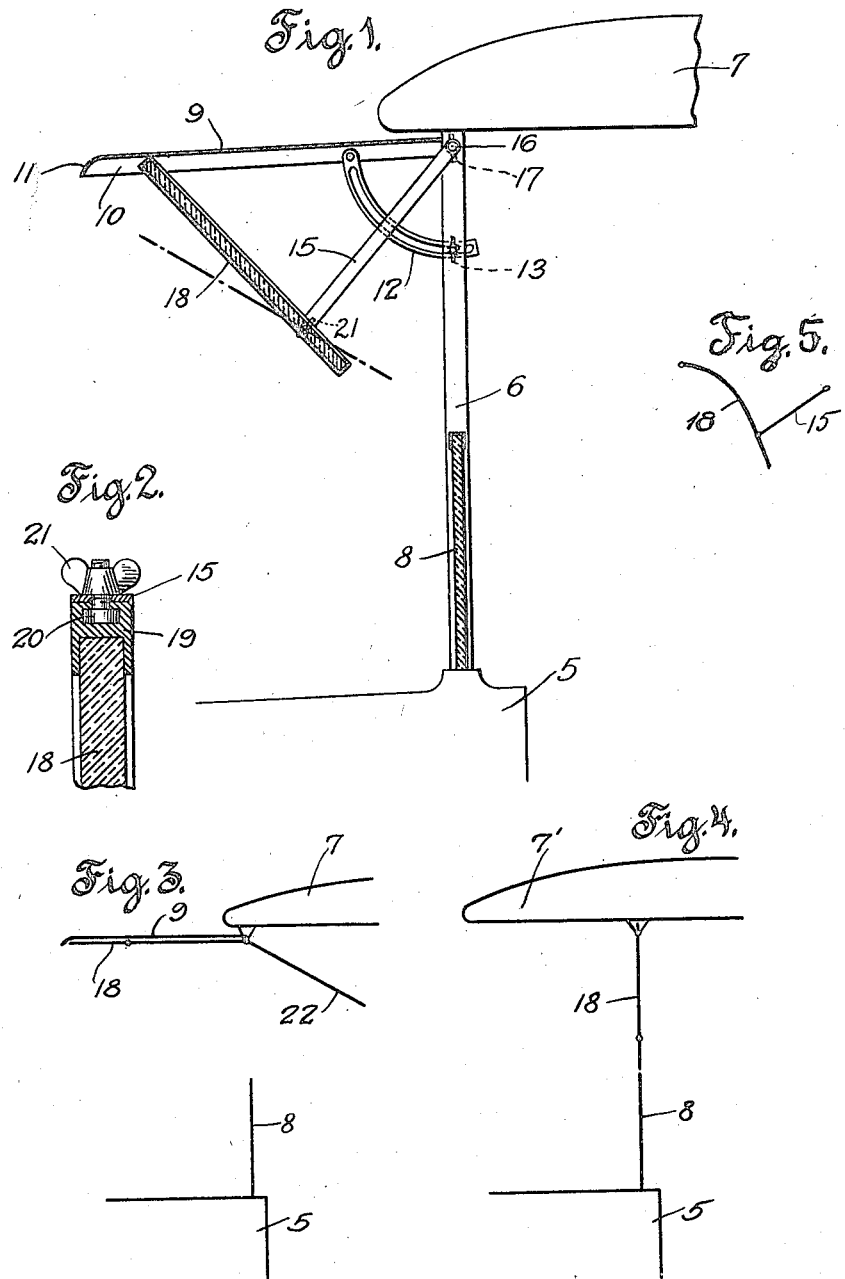
INVENTOR
George F. Miles
BY
Mitchell Brothers
ATTORNEYS.

Patented Oct. 23, 1923.

1,471,856

UNITED STATES PATENT OFFICE.

GEORGE F. MILES, OF NEW YORK, N. Y.

WINDSHIELD CONSTRUCTION.

Application filed May 15, 1922. Serial No. 560,932.

*To all whom it may concern:*

Be it known that I, GEORGE F. MILES, a citizen of the United States of America, residing at New York, N. Y., have invented a new and useful Windshield Construction, of which the following is a specification.

My invention relates to a windshield construction and more specifically to a novel form of so-called clear-vision windshield, wherein there is provided a deflector section for deflecting rain and snow to a point below the ordinary line of clear vision. My present invention is in some respects similar to the invention disclosed in my copending application #420,084, filed October 28th, 1920.

It is an object of my invention to provide, in connection with an automobile or other windshield, a deflector member adapted to be moved to various angles of adjustment relatively to the lower section.

It is a more specific object to provide, in connection with a windshield, a deflector element which is pivotally mounted on the free ends of pivotally supported supporting arms, whereby the deflector element may be swung inwardly so as to be in substantial alignment with the lower windshield section or be swung outwardly to an out of the way position, and which may be adjusted in various intermediate positions.

Briefly stated, in the preferred form of my invention I provide, in connection with an ordinary windshield, a deflector element which is pivoted to a pair of arms at their free ends, and these arms are pivotally mounted from the usual windshield standards or other portions of an automobile. The deflector member may be used in addition to or may be so formed as to take the place of the ordinary upper movable panel section of a windshield. A protecting or shade element is provided to protect the upper side of the deflector member and prevent the entrance of snow and rain to a point between the deflector and the space ordinarily occupied by the upper windshield section.

In the drawings I have shown for illustrative purposes preferred forms of the invention.

In said drawings:

Fig. 1 is a partially diagrammatic sectional view illustrating my invention as applied to an automobile.

Fig. 2 is a fragmentary section on an enlarged scale of a detail.

Fig. 3 is a diagrammatic view similar to Fig. 1, but illustrating a modified form.

Fig. 4 is a diagrammatic view likewise illustrating a modification.

Fig. 5 illustrates conventionally an edge view of a curved deflector.

In the drawings, 5 indicates the usual dashboard and cowl section of an automobile. Windshield supporting standards, such as 6, are provided above the cowl. These standards may be separate standards, as in the ordinary open type of car, or may be parts of the front section of a closed car, and it should be understood that my invention is not limited to any particular type of car, except as herein otherwise indicated. 7 indicates a fragment of the top of an automobile extending over the upper ends of the standards 6. The usual lower glass windshield section 8 is supported in any suitable manner between the standards.

A protecting shield or shade section 9 is secured to the standards and is preferably hinged thereto so as to be adjustable. The shade element 9 may be of any suitable transparent material, or may be in the form of a sheet metal pan having depending flanges, such as 10, and a depending forward lip 11. The shade element may be held in the desired position of adjustment in any suitable manner, such as by the well known type of sector 12 and wing nut 13.

In Fig. 1 the usual upper windshield panel has been omitted for the reason that, in the particular form there shown, the deflector member hereinafter described may be used in place of the upper windshield panel.

15 indicates one of a pair of arms pivotally supported from the standards at 16 at opposite sides of the automobile. Suitable means, such as wing nuts 17, hold the arms in various positions of adjustment. A deflector element 18 preferably of glass is pivotally mounted at the free ends of the arms 15, and may be secured in various angular positions relatively thereto.

In the preferred form the frame or border member 19 for the deflector 18 is recessed or has an undercut passage along each side, in order to receive and accommodate a T-headed screw 20 which engages the wing nut 21. By this arrangement it will be seen that the pivotal position of the deflector member 18 on the free ends of the supporting arms 15 may be varied and the deflector held in adjusted position.

The construction thus far described is used as follows:

The shade element 9 is moved to the desired angular position, which is preferably up high enough so as not to obstruct or interfere with the view of the driver within the car. The supporting arms 15 and the deflector member 18 are then moved to some position of angular adjustment, for example, such as shown in Fig. 1, wherein the lower edge of the deflector is spaced above and forwardly of the upper edge of the lower windshield panel 8. This open space affords a clear and unobstructed view for the driver of the car.

It should be noted that snow or rain, upon striking the deflector element, will be deflected downwardly toward the lower part of the lower windshield section and thus would be prevented from passing through the open space between the deflector and the section 8 and the shade element 9 acts as a protection to prevent rain or snow from entering above the deflector element. The length of the arms 15 is such, and the pivotal position of the deflector thereon is such, that the deflector 18, after loosening the wing nuts 17 and 19, may be swung downwardly so as to occupy the position usually occupied by the ordinary upper windshield section, or the deflector may be swung upwardly and outwardly and be housed within or beneath the shade element 9.

In the modification shown in Fig. 3, the shade element 9 as well as the supporting arms for the deflector 18, are both supported from the top of an automobile and not from the standards, such as is the case with the form shown in Fig. 1.

In Fig. 3 I have also indicated the conventional upper windshield section 22, which is in addition to the deflector member 18. It will thus be observed that my deflector member is applicable to the ordinary windshield having both upper and lower panels, or in some cases, for example as shown in Fig. 1, the deflector takes the place of the upper movable panel. In Fig. 3 the deflector 18 is shown as having been rotated on its supporting arms and then swung outwardly so as to be housed beneath the shade section 9.

In the modification shown in Fig. 4 the top of the automobile has been extended a substantial distance beyond the windshield section, as indicated at 7', and this extended automobile top in this modification is, and performs the function of, the shield or shade section hereinbefore described in connection with the other embodiments of the invention. In this modification also the deflector member 18 is supported from the automobile top. The deflector 18 in Fig. 4 is shown swung down and occupies the space ordinarily closed by the upper movable panel of a conventional windshield.

It will thus be seen that I have provided a novel windshield construction which may be adjusted to various positions and which will afford a proper open space for clear vision and prevent the entrance of snow and rain to the interior of the automobile.

While I have disclosed specific forms in which my invention may be embodied, I wish it to be understood that I am not limited to the forms disclosed, since various modifications and changes may be made within the scope of the appended claims.

In Fig. 5 I have indicated that the deflector may be curved in cross section, the curve being preferably parabolic, the purpose being to generate in a relatively narrow shield an effective, powerful draft.

I claim:

1. In a windshield construction, a lower windshield panel, a shade element projecting forwardly and positioned above said lower element, a pair of pivotally supported arms, and a deflector member pivotally supported from the free ends of said arms and positioned beneath the shade element whereby said deflector member may be moved to various positions and angles relatively to the lower panel.

2. In a windshield construction, a pair of supporting standards, a lower windshield panel positioned therein, a shield element adjustably supported at the upper ends of said standards, a pair of arms pivotally mounted at the upper ends of said standards, a deflector member pivotally connected to the free ends of said arms, and below the shield element, whereby the deflector member may be set forwardly of and at an angle to the lower panel to prevent rain or snow from depositing on the deflector and whereby an open, clear-vision space may be provided between the upper edge of the lower windshield panel and the adjacent edge of the deflector member.

3. In a windshield construction, a lower windshield panel, a shade element above and projecting forwardly of said lower windshield panel, a deflector member below said shade element, means for supporting said deflector member in various positions relatively to said lower section and said shade element, one of said positions of adjustment being at an angle to and forwardly of and spaced from the lower wind shield section whereby snow and rain will be deflected downwardly below the upper edge of said lower wind shield panel, and the space between said deflector element and said lower wind shield panel providing a space for clear vision.

4. In a wind shield construction, a lower wind shield panel, a deflector member, means suspended from above for pivotally supporting said deflector member forwardly of and above said lower wind shield panel and for moving the same bodily forward relatively thereto, and means extending forwardly of said deflector member and independent thereof for sheltering the upper side thereof.

5. In a wind shield construction, a lower wind shield panel, a pair of arms pivotally supported above said lower panel, and a deflector member pivotally and slidably supported from the free ends of said arms, and an independently mounted co-acting sheltering element mounted above said deflector member.

6. In a windshield construction, a lower windshield panel, a shade element supported above and extending forwardly of said panel, a deflector member arranged beneath said shade element and independently thereof, and means for supporting said deflector member whereby the rear edge of said deflector may be swung downwardly and the forward edge may be swung rearwardly to substantially close the space between the lower windshield section and the shade element.

7. In a wind shield construction, a lower wind shield panel supported beneath the top of an automobile, an upper deflector member, a pair of arms pivotally suspended from points above the lower panel and below the said automobile top, means for pivotally connecting said deflector at points below the upper edge of the latter to the lower free ends of said arms whereby the deflector may be positioned at an angle to and above and spaced from said lower wind shield panel for providing a clear vision space, and an independent forwardly projecting sheltering element.

8. In a wind shield construction, a lower wind shield panel, an upper deflector member, means suspended from points above the lower panel for pivotally supporting said deflector member forwardly of and above said lower wind shield panel, and means extending forwardly of said deflector member and independent thereof for sheltering the upper side thereof, the vertical cross section of said deflector member being in the form of a curve, the rear edge of said deflector being mounted to swing downwardly to substantially close the space adjacent the upper edge of the lower panel.

GEORGE F. MILES.